United States Patent
Kulkarni et al.

(10) Patent No.: US 11,790,886 B2
(45) Date of Patent: Oct. 17, 2023

(54) SYSTEM AND METHOD FOR SYNTHESIZING AUTOMATED TEST CASES FROM NATURAL INTERACTIONS

(71) Applicant: Cyara Solutions Pty Ltd, Hawthorn (AU)

(72) Inventors: Alok Kulkarni, Glen Iris (AU); Geoff Willshire, Greenslopes (AU); Thomas Fejes, Freshwater (AU)

(73) Assignee: CYARA SOLUTIONS PTY LTD, Hawthorn Vic (AU)

( * ) Notice: Subject to any disclaimer, the term of this patent is extended or adjusted under 35 U.S.C. 154(b) by 252 days.

(21) Appl. No.: 17/091,370

(22) Filed: Nov. 6, 2020

(65) Prior Publication Data
US 2022/0148568 A1    May 12, 2022

(51) Int. Cl.
| | |
|---|---|
| H04M 1/24 | (2006.01) |
| H04M 3/28 | (2006.01) |
| H04M 3/493 | (2006.01) |
| G10L 15/01 | (2013.01) |
| G10L 15/26 | (2006.01) |
| G10L 15/22 | (2006.01) |
| G06N 20/00 | (2019.01) |
| H04M 3/24 | (2006.01) |

(52) U.S. Cl.
CPC ............ G10L 15/01 (2013.01); G06N 20/00 (2019.01); G10L 15/22 (2013.01); G10L 15/26 (2013.01); H04M 3/24 (2013.01); H04M 3/28 (2013.01)

(58) Field of Classification Search
CPC ........... H04M 3/493; H04M 3/28; H04M 1/24
See application file for complete search history.

(56) References Cited

U.S. PATENT DOCUMENTS

| | | | | |
|---|---|---|---|---|
| 2009/0248415 A1* | 10/2009 | Jablokov | ................. | G10L 15/30 704/251 |
| 2016/0050317 A1* | 2/2016 | Natesan | ................ | H04M 3/493 379/88.01 |

(Continued)

OTHER PUBLICATIONS

"IVR testing", Online [https://cyara.com/solutions/ivr-testing], archived by web.archive.org on Mar. 27, 2020. (Year: 2020).*

*Primary Examiner* — Jialong He
(74) *Attorney, Agent, or Firm* — Galvin Patent Law LLC; Brian R. Galvin; Brian S. Boon

(57) ABSTRACT

A system for synthesizing real IVR scenarios, automatically reproducing test scenarios, and providing accurate reports on those scenarios. An IVR tester uses a telephony device (website, mobile app, VOIP, etc.) and an automated IVR test case generator to place test calls to an IVR system. The automated IVR test case generator intercepts and collects the phone call's audio stream, dual-tone multi-frequency signals, and available metadata (e.g., response times, post-speech silence timeout, etc.). Once the call is complete, the automated IVR test case generator pre-populates a webpage or other user-interface technology and a database with the audio stream, dual-tone multi-frequency signals, and available metadata from the test scenario phone call. The IVR tester may then save that test scenario and continue to the next scenario. The saved scenario may now be used automatically by the IVR test case generator for regression testing or duplicated and edited for use in other systems.

5 Claims, 13 Drawing Sheets

(56) References Cited

U.S. PATENT DOCUMENTS

2016/0198045 A1* 7/2016 Kulkarni ................ H04M 3/28
                                                    379/88.01
2016/0227034 A1* 8/2016 Kulkarni ................ H04M 3/24
2022/0051658 A1* 2/2022 Krishnamoorthy .. G06K 9/6288

* cited by examiner

Fig. 6B

Results  ← 610

- Data import starting
- Importing Services...
- All Services processed
- Importing blocks...
- All Blocks processed
- Importing Test Cases...
- 1800 ▮ 2020-10-16T05:30:22.220Z Joe.Bloggs
  - Test Case Number 1: 1800 ▮ 2020-10-16T05:30:22.220Z Joe.Bloggs
  - Folder path: \_Phone
  - Call step StepNo 1
  - Call step StepNo 2
  - Call step StepNo 3
  - Call step StepNo 4
  - Call step StepNo 5
  - Starting TestCase validation...
  - Starting steps data validation
  - Validating step at position 0
  - Validating step at position 1
  - Validating step at position 2
  - Validating step at position 3
  - Validating step at position 4
  - Validating step at position 5
  - Saving Test Case '1800 ▮ 2020-10-16T05:30:22.220Z Joe.Bloggs' to storage.
  - Successfully imported Test Case 1800 ▮ 2020-10-16T05:30:22.220Z Joe.Bloggs
- All Test Cases processed

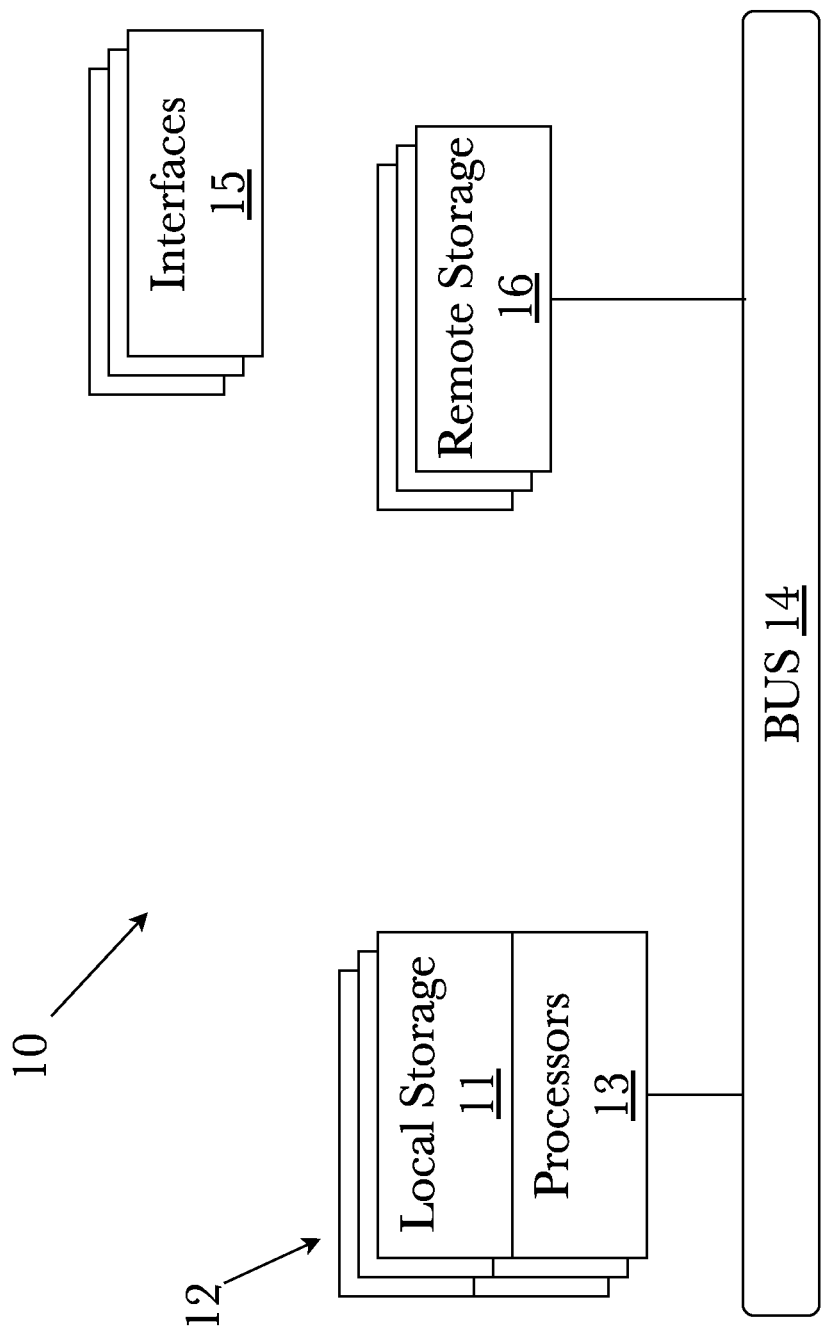

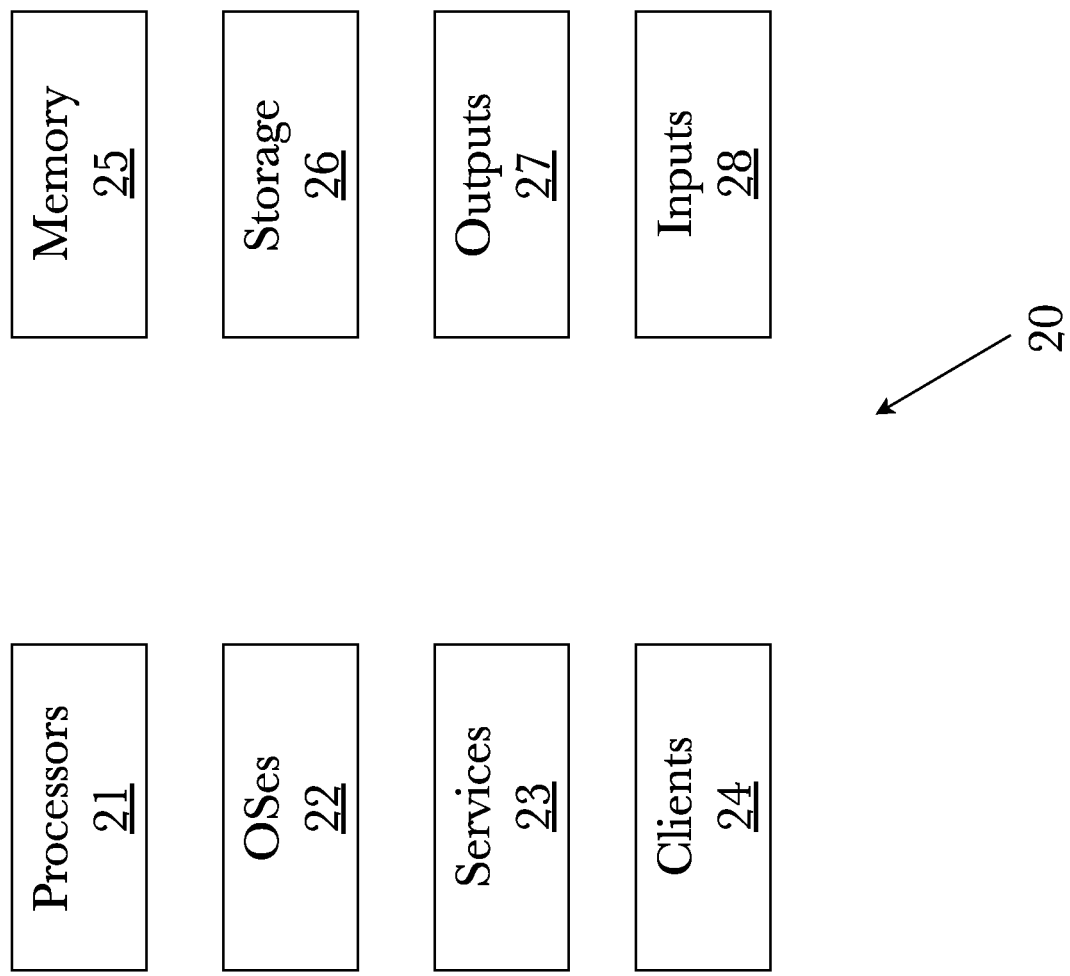

SYSTEM AND METHOD FOR SYNTHESIZING AUTOMATED TEST CASES FROM NATURAL INTERACTIONS

CROSS-REFERENCE TO RELATED APPLICATIONS

None.

BACKGROUND

Field of the Art

The disclosure relates to the field of computer systems, and more particularly to the field of automated test generation of interactive voice response systems.

Discussion of the State of the Art

Currently, the dominant method of testing interactive voice response (IVR) systems is manual testing by IVR testing personnel, whereby an IVR tester manually places a phone call to a client's IVR system, performs a specific sequence of voice or DTMF commands, records the results, and begins anew. Due to the time and cost requirement, it is estimated that less than ten percent of all possible scenarios are ever tested. Furthermore, because of the human element involved, errors in reporting can be frequent and if any change to the IVR system is implemented, all previous test cases must be performed again. This process is inefficient, costly, avoidably inaccurate, and untimely for IVR system providers. Automated testing systems exist, but their adoption is limited by the requirement for extensive programming knowledge to program the automated tests prior to deployment.

What is needed is a system and method for automatically generating IVR test scenarios from natural interactions with IVR systems without the need for any programming knowledge.

SUMMARY

Accordingly, the inventor has conceived and reduced to practice, a system for synthesizing automated IVR test cases from natural interactions, comprising: an IVR test case generator comprising at least a plurality of programming instructions stored in a memory of, and operating on at least one processor of, a computing device, wherein the plurality of programming instructions, when operating on the at least one processor, cause the computing device to: receive IVR test case data, wherein the received data comprises an audio stream, dual-tone multi-frequency signals, and metadata relating to the IVR test case; perform speech transcription on the audio stream; use the metadata, speech transcription, and dual-tone multi-frequency signals to automatically create an IVR test case.

According to another embodiment, the inventor has conceived and reduced to practice, a method for synthesizing automated IVR test cases from natural interactions, comprising the steps of: receive IVR test case data, wherein the received data comprises an audio stream, dual-tone multi-frequency signals, and metadata relating to the IVR test case; perform speech transcription on the audio stream; use the metadata, speech transcription, and dual-tone multi-frequency signals to automatically create an IVR test case.

According to one aspect, the received IVR test case data originates from a communication device or storage medium.

According to one aspect, the metadata comprises identifying information as to the source and geolocation of received data.

According to one aspect, the IVR test case generator further receives data from any Internet-connected source.

According to one aspect, the IVR test case only uses the metadata.

According to one aspect, the IVR test case only uses the speech transcription.

According to one aspect, the IVR test case only uses the dual-tone multi-frequency signals.

According to one aspect, the IVR test case generator further comprises machine learning algorithms.

According to one aspect, the machine learning algorithms alter the audio stream recorded by the IVR test case generator.

According to one aspect, the machine learning algorithms generate synthetic audio streams.

According to one aspect, the IVR test case generator further comprises computer algorithms.

According to one aspect, the computer algorithm creates an IVR test case for every dual-tone multi-frequency signal combination.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 6B is a block diagram illustrating another aspect of an exemplary user interface for an IVR test case generator.

FIG. 7 is a block diagram illustrating an exemplary hardware architecture of a computing device.

FIG. 8 is a block diagram illustrating an exemplary logical architecture for a client device.

DETAILED DESCRIPTION

Figure 1:
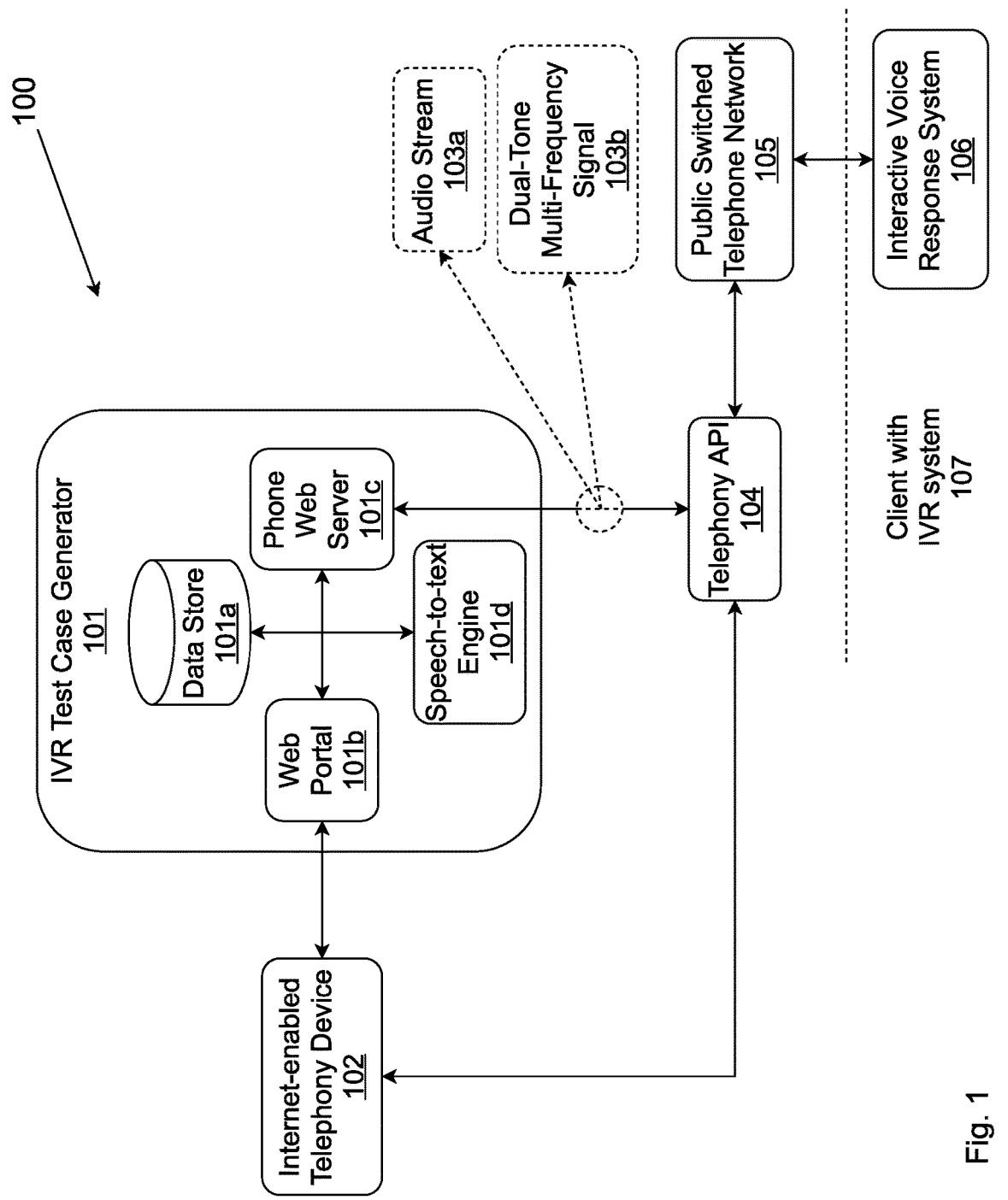
FIG. 1 is a block diagram illustrating an exemplary system architecture for an IVR test case generator.

The inventor has conceived, and reduced to practice, a system and method for synthesizing real IVR scenarios, automatically reproducing test scenarios, and providing accurate reports on those scenarios. An IVR tester uses a telephony device (website, mobile app, VOIP, etc.) and an automated IVR test case generator to place test calls to an IVR system. The automated IVR test case generator intercepts and collects the phone call's audio stream, dual-tone multi-frequency signals, and available metadata (e.g., response times, post-speech silence timeout, etc.). Once the call is complete, the automated IVR test case generator pre-populates a webpage or other user-interface technology and a database with the audio stream, dual-tone multi-frequency signals, and available metadata from the test scenario phone call. The IVR tester may then save that test scenario and continue to the next scenario. The saved scenario may now be used automatically by the IVR test case generator for regression testing or duplicated and edited for use in other systems.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for an IVR test case generator 101. According to one embodiment, an IVR test case generator 101 comprises a data store 101*a*, a web portal 101*b*, a phone web server 101*c*, and a speech-to-text engine 101*d*. The IVR test case generator 101 enables an IVR tester, a person whose job it is to test scenarios of a company's IVR system, to create and save test scenarios that may be used later to automatically perform regression testing or cross-client templates.

An IVR tester uses a telephony device 102 such as a landline phone, wireless phone, satellite phone, VOIP phone, analog-to-digital phone, misc Internet-enabled device, etc. with at least a phone-like interface or physical buttons which include a number pad and dial and hang up options. Other telephony devices 102 may include software-based phones such as ones in a web browser, website, mobile app, mobile device, desktop software, and other embodiments known to those in the art. The telephony device 102 is connected with the IVR test case generator's web portal 101*b* and a telephony application programming interface (API) 104. The connection between the telephony device 102 and web portal 101*b* may be accomplished by APIs, software agents, hardware taps, conference calling, or by calling an intermediary phone number that passively or actively facilitates the connection, or other means by which to connect telephone calls to a network-connected resource. According to one embodiment, the telephony device 102 may be hosted on the web portal 101*b* and require a user to login with credentials which create authentication cookies that can be used to call a telephony API 104. This is one example, however many combinations of telephony devices, cybersecurity measures, and APIs exist such that a person with ordinary skill in the art can easily work out any number of embodiments.

According to one embodiment, an IVR tester logs into the web portal 101*b* via a web browser and is presented with a graphical user interface (GUI) telephony device 102. The IVR tester dials the client's 107 IVR system 106 and begins to perform the desired test scenario. During the test scenario call, a phone web server 101*c* intercepts the audio stream 103*a* and any number pad presses known as dual-tone multi-frequency signals 103*b*. According to one aspect, the DTMF signals 103*b* provide the IVR test case generator 101 with the number dialed and the numbers input during the call. Additional examples comprise the interception or collection of audio 103*a* and DTMF signals 103*b* directly from the telephony device 102, web portal 101*b*, or by API calls 104, or via the public switched telephone network (PSTN) 105. The PSTN disclosed herein is one example of a telephony network. Other telephony networks may be involved such as VoIP, PBX, KSU, SIP, and other landline, wireless networks, and unified communications known in the art.

According to one embodiment, audio 103*a* and DTMF signals 103*b* intercepted are processed by a speech-to-text engine 101*d* which transcribes the audio but may also detect post-speech silence timeout, which is how many seconds of silence the IVR system 106 detects before responding. The speech-to-text engine 101*d*, or another speech analysis engine in other embodiments, may be used to detect the language of the speaker, any dialect of the speaker, and differentiate between the IVR tester and the IVR system voices.

According to one embodiment, when the test scenario phone call is complete or terminated, the IVR test case generator 101 presents the IVR tester with a New Test Case webpage that is pre-populated with data from the web portal 101*b* (e.g., the IVR tester's information, connection status, etc.), the phone web server 101*c* (e.g., raw audio stream 103*a*, DTMF tones 103*b*, number dialed, menu options chosen, length of call, etc.), and the speech-to-text engine 101*d* (e.g., audio transcript, language and dialect, prompts and replies, time information, etc.). In this embodiment, the New Test Case webpage may be presented in the same web portal 101*b* as the GUI telephony device 102 from which the IVR tester may review and edit the pre-populated information, choose a name for which to save the test scenario as, and save.

With the new test scenario and all of the associated data saved to a data store 101*a*, the IVR tester can perform a new and different test case. The IVR test case generator 101 can then be configured to perform the saved test case on its own without a human for regression testing.

Various embodiments may implement aspects such as caller ID, phone number spoofing, auto-redial, language translation, profanity filter, cloud-based storage, cloud-based processing, and other cloud-based services. Saved test cases may be used as templates to create new test scenarios. These may be used for the same or new client IVR systems.

Some embodiments may provide a marketplace to sell templates or packages of IVR test scenarios to interested parties.

Figure 2:
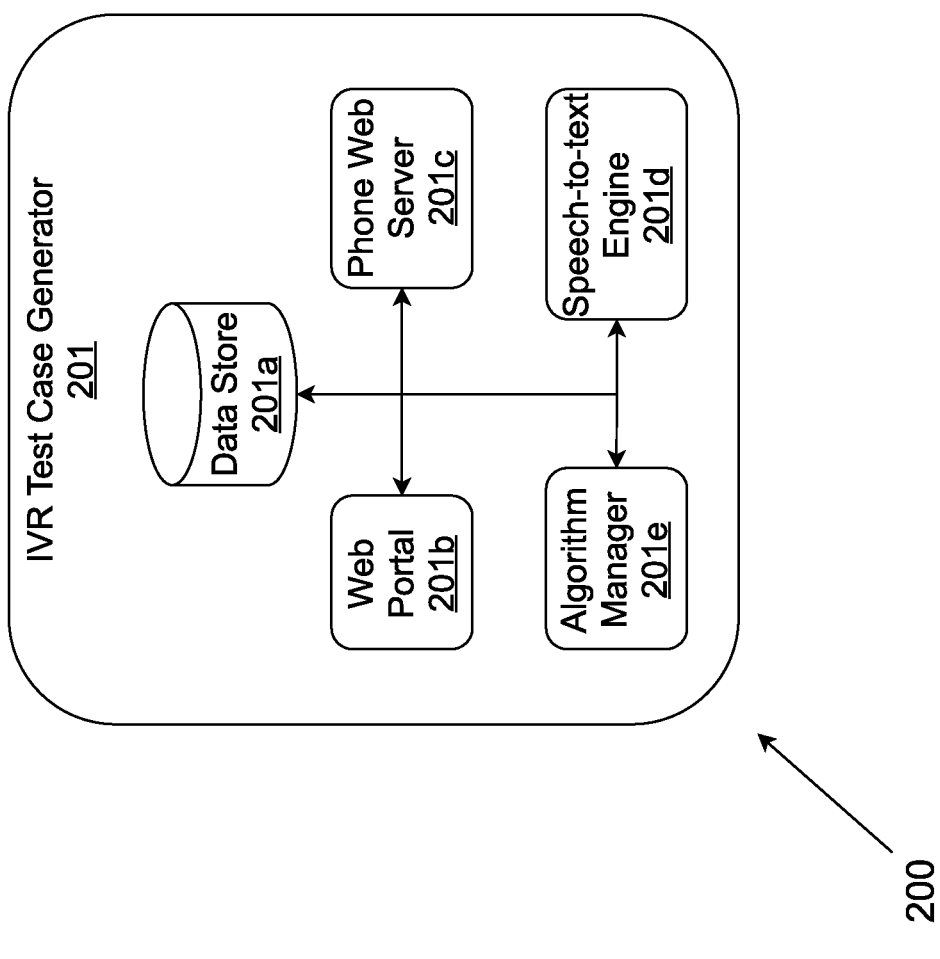
FIG. 2 is a block diagram illustrating an exemplary system architecture for an IVR test case generator using computer algorithms.

FIG. 2 is a block diagram illustrating an exemplary system architecture 200 for an IVR test case generator 201 using computer algorithms. According to one embodiment, the IVR test case generator 201 comprises the same aspects (201*a*-201*d*) of the IVR test case generator 101 (101*a*-101*d*) from FIG. 1 with the addition of an algorithm manager 201*e*.

According to one embodiment, the algorithm manager 201*e* comprises machine-learning algorithms that generate synthesized IVR tester conversations. Machine learning algorithms may generate verbatim test case scenarios in different languages or dialects. Other machine learning algorithms may slightly alter the order of words, replace words with synonyms or commonly misused words, or generate wholly new interactions from ingesting large data sets.

Another embodiment comprises the use of standard combinational algorithms to generate IVR test scenarios using every combination of DTMF signals 103*b*. This significant aspect allows the client to have nearly one hundred percent of possible test cases tested without the need and cost of a human. According to another embodiment, an IVR test case generator 201 may comprise combinational algorithms, machine-learning algorithms, and human generated test cases and any combination thereof to provide the largest possible test case database.

Additional embodiments may include the purposeful generation of incorrect voice or DTMF signals so as to test the cybersecurity of a client's IVR system. Approaches of machine-learning algorithms may comprise graph analysis, ontological models, supervised learning, unsupervised learning, reinforcement learning, semi-supervised learning, self-supervised learning, multi-instance learning, inductive learning, deductive learning, transductive learning, generative adversarial networks, deep learning, shallow learning, and other types of machine-learning models not mentioned here.

Detailed Description of Exemplary Aspects

Figure 3:
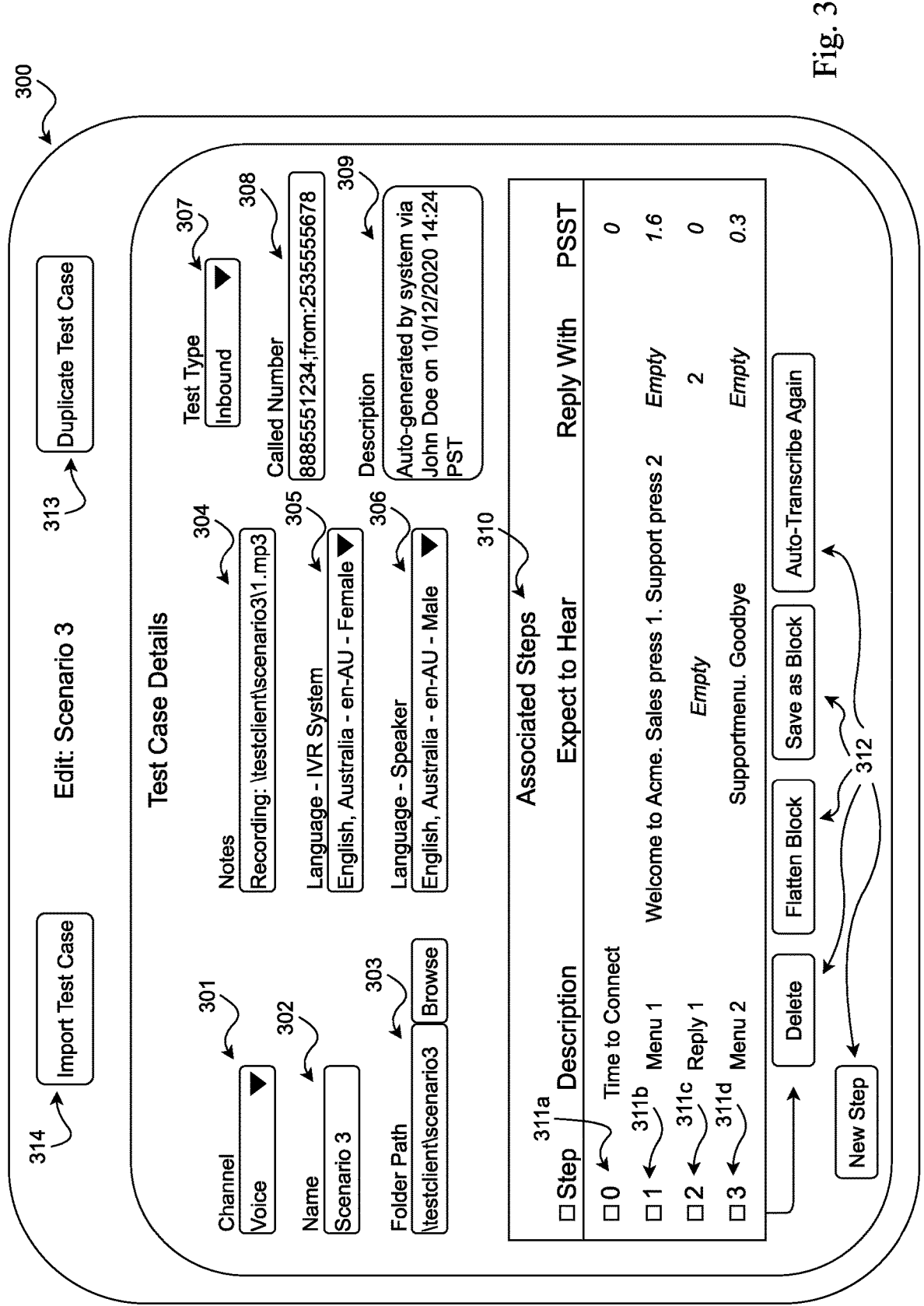
FIG. 3 is a block diagram illustrating one aspect of an exemplary user interface for an IVR test case generator.

FIG. 3 is a block diagram illustrating an exemplary user interface 300 for an IVR test case generator, according to one aspect. The user interface 300 in this aspect of an embodiment is generated and presented to an IVR tester after completion of a test scenario phone call to a client's IVR system. Data intercepted, collected, and generated from an IVR test case generator is pre-populated into the user interface 300. Pre-populated fields include the channel 301, test scenario name 302, folder path 303, notes 304, IVR system language 305, IVR tester language 306, test type 307, origin and destination phone numbers 308, and description 309. The IVR tester may edit or add to any of these fields such as renaming 302 the scenario, changing the folder path 303, or changing the channel 301 from voice to DTMF as a few examples.

A speech analysis engine, such as an advanced speech-to-text engine according to one embodiment, pre-populates the steps detected from the associated test phone call 310. Steps may be determined by first logging the time to connect as Step 0 310*a*. Then associating each block of responses from either the IVR tester or the IVR system with a new step 311*b*-311*d*. The IVR tester may employ a series of standard editing features 312 to alter the associated steps 310 to correct or better fit the test case with the desired scenario. IVR testers or IVR test case generator administrators may duplicate test cases 313 for cross-client, cross-IVR system, or regression testing. Additionally, test cases may be imported 314 from XML files, API streams, or other formats capable of text, audio, and data storage.

This user interface is just one example of a plurality of features that an embodiment may utilize. Other embodiments of a user interface may comprise more items, e.g., a map displaying the IVR and user locations, charts and graphs showing trends or other aspects related to the IVR testing process, or less items, e.g., comprising only a name 302 and save location 303. The combination of UI elements is trivial to those with ordinary skill in the art where any number of combinations may be manifested.

Figure 4:
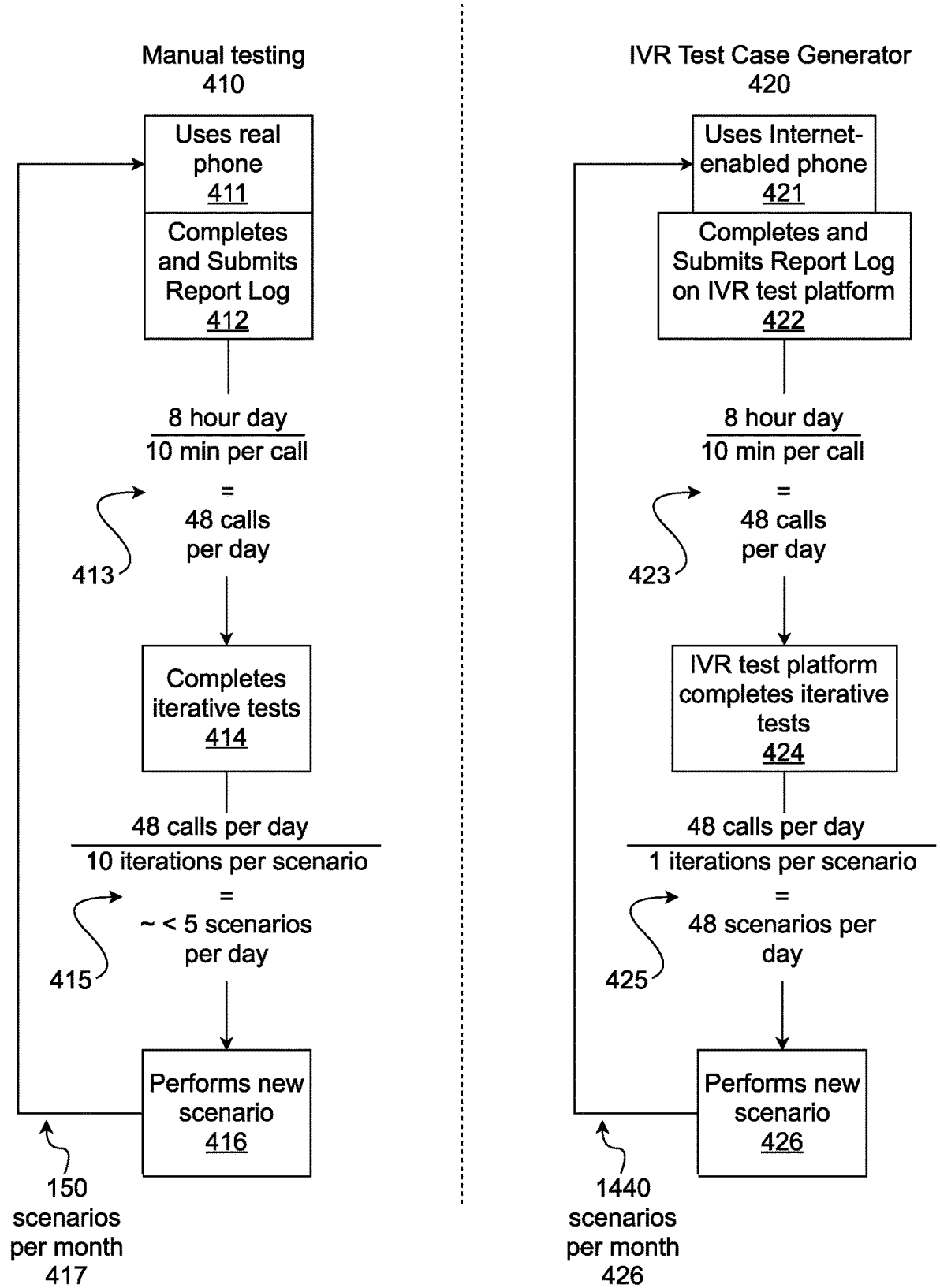
FIG. 4 is a flow diagram illustrating a comparative analysis between IVR testing methods.

FIG. 4 is a flow diagram illustrating a comparative analysis between IVR testing methods. This flow diagram demonstrates the practical use of an IVR test case generator. According to one embodiment, manual testing methods 410 comprise manual dialing 411 and reporting of each test call 412. If we assume five minutes per call and five minutes to at least log the results, we arrive at ten minutes per call for forty-eight calls per typical workday 413. Because IVR testing relies on an average, and to account for outliers, IVR testers normally perform at least ten iterations of each scenario 414. Before an IVR tester can move on to a new scenario 416, he or she performs the standard ten iterations 414 for an approximate average of less than five scenarios per day 415. If an IVR tester completes at least 5 scenarios per day, that is at most one hundred and fifty scenarios per month 417.

Employing an IVR test case generator 420 has many advantages over manual testing 410 methods. When the IVR tester calls an IVR system 421, the raw audio and DTMF tones may be captured and used to pre-populate a more detailed, more accurate, and more timely report 422 than a manual report 412. The IVR tester still makes his or her forty-eight calls per day 423, however each call is a new scenario 426 as the IVR test case generator takes over iterative calls 424 after the first one is completed. This exemplary method allows for forty-eight scenarios per day 425 which leads to one-thousand four hundred and forty scenarios per month 426.

The calculations in this diagram only account for testing one IVR system with no changes throughout the entire month of testing. Should even one aspect of the IVR system change, all tests will need to be performed again. This is called regression testing and costs companies using IVR systems substantial time and money to perform manually. Automated testing dramatically reduces this cost by automatically testing systems not directly affected by the changes. For changed portions of the IVR saved test scenarios may still be used by editing (one at a time or in batches) the details of the scenario, as laid out in FIG. 3.

If an IVR system's menu has one initial menu with six options, six subsequent menus each with three options, and an IVR tester wants to try each number DMTF tone, it will take at least fifty-six calls or at most one hundred and twenty-two if star and pound DTMF tones are used, or two hundred and six using all available DTMF tones. If each scenario needs ten iterations, that is two thousand and sixty phone calls. This is the significance of an IVR test case generator.

Figure 5:
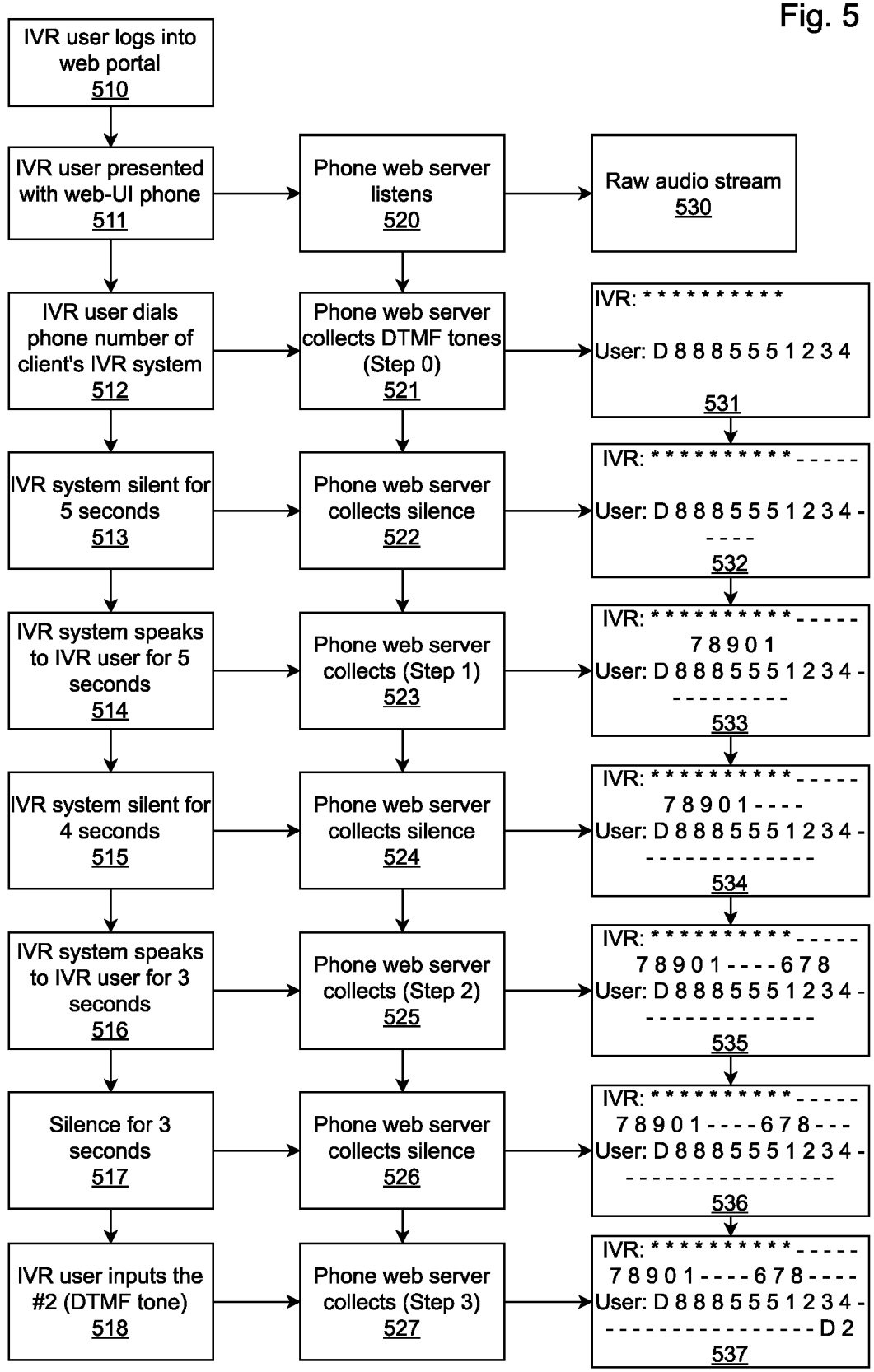
FIG. 5 is a flow diagram illustrating an example use case of an IVR test case generator using an exemplary method, according to one aspect.

FIG. 5 is a flow diagram illustrating an example use case of an IVR test case generator using an exemplary method, according to one aspect. According to one embodiment, this example is twenty seconds of IVR audio with DTMF input. Each dash in the figure represents one second of silence, an asterisk symbol denotes no data (typically from no connection), and each digit represents one second of speech and its value is the end of each second modulo ten, unless preceded by the character D, which denotes the successive digits are DMTF tones.

The example begins when an IVR tester, also referred to as a user, logs into the web portal 510 of an IVR test case generator. The user is then presented a web-UI number pad with at least an option to dial and hang up. Other embodiments may include number-spoofing, call waiting, auto-redial, and other commonly known telephony technologies. Any number of preceding menus, options, or authentication techniques may exist between the IVR user logging in and the IVR user being presented the web-UI phone 511.

As the user is presented the web-UI 511, the phone web server begins to listen 520 and record the raw audio stream 530. The user then dials the IVR system's phone number 512 where the DMTF tones are recorded 531 and the IVR test case generator records this as step 0 521. The phone web server records two sequences of numbers, one for the IVR system and the other for the user 531. The two sequences at this point began when the user dialed the phone number 512 (888-555-1234) that is represented by eleven seconds of no data from the IVR system, because it has not picked up the line, and by a D followed by the numbers dialed in the user's sequence.

After the IVR system picks up the call, there is a five second delay 513 before the IVR system greets the user and prompts him or her to make a choice, which takes five seconds 514. The phone web server collects both the silence 522 and the IVR system's speech which because of the silence, also interprets this as step 1 523. The phone web server data sequences now include the five seconds of silence 532 and five seconds of speech 533.

The IVR system now awaits the user's response for three seconds and upon hearing no response at the beginning of second four 515, tells the user to try again which takes three seconds 516. Both the silence 524 and IVR system's speech 525 are collected. The silence is stored as dashes 534 and the speech is stored as digits 535. After three seconds of silence 517 (that is also recorded 526, 536) the user clicks or presses the number two 518 which sends the appropriate DTMF signal and is recorded by the phone web server 537 as step 3 527.

These symbols and digits are one method of collecting and interpreting voice and DTMF signals during an IVR system test call. These symbols and digits may be used to pre-populate fields in an IVR test case generator. Many embodiments are possible, and this is only one exemplary method of data capture. Persons with ordinary skill in the art may appreciate many techniques of data capture possible for the implementation of an IVR test case generator.

Figure 6A:
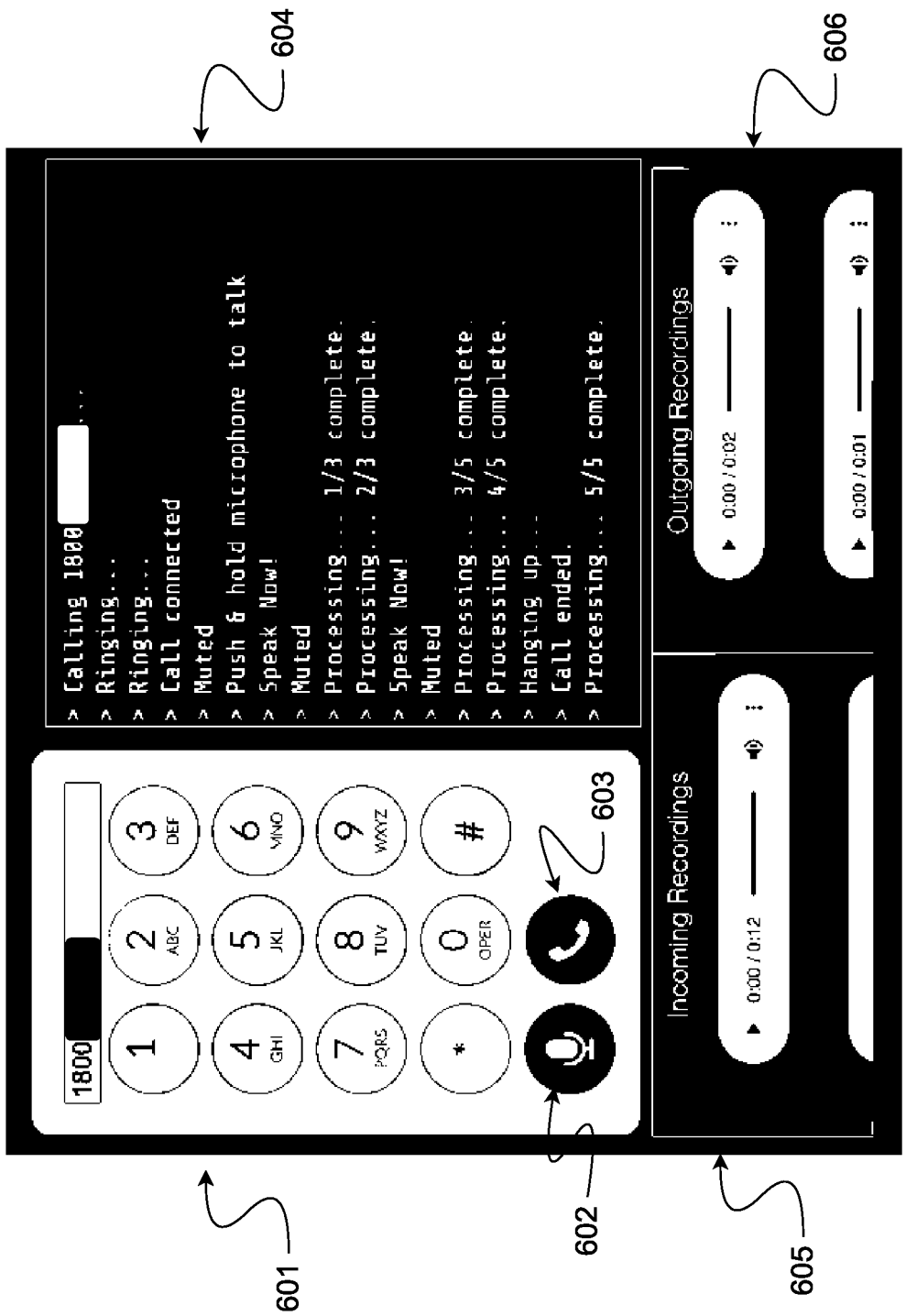
FIG. 6A is a block diagram illustrating another aspect of an exemplary user interface for an IVR test case generator.
Figure 6C:
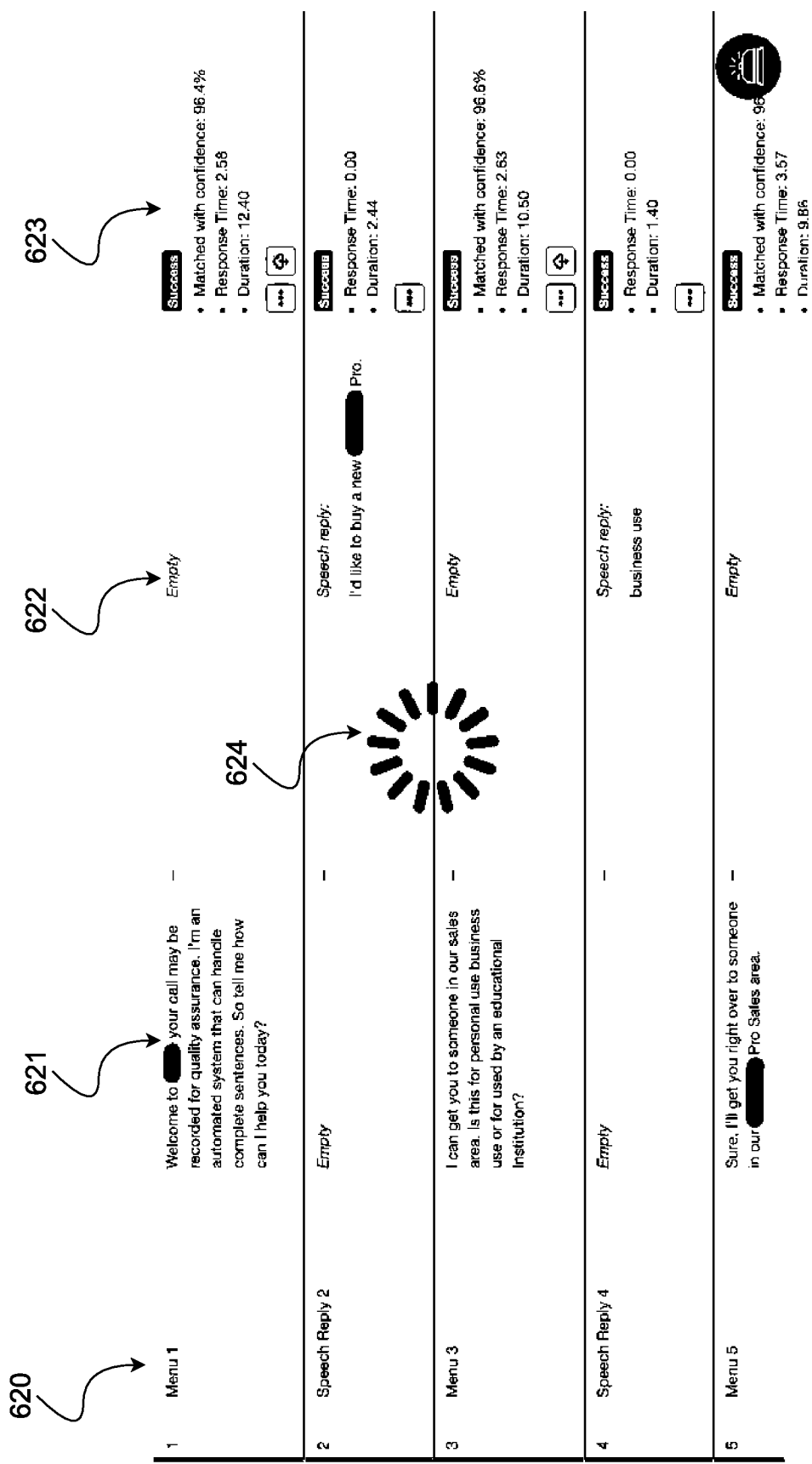
FIG. 6C is a block diagram illustrating another aspect of an exemplary user interface for an IVR test case generator.
Figure 6D:
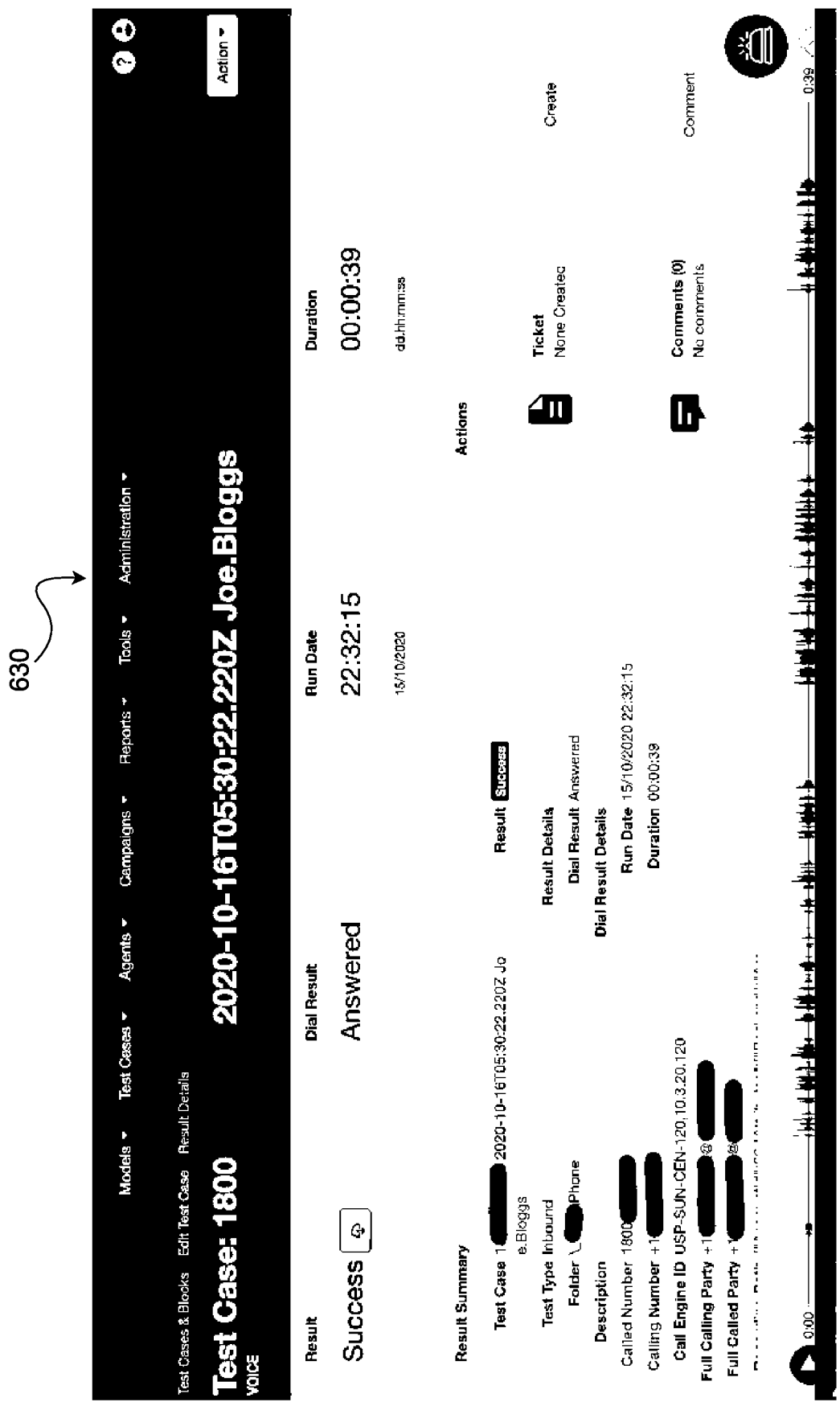
FIG. 6D is a block diagram illustrating another aspect of an exemplary user interface for an IVR test case generator.

FIG. 6 is a block diagram illustrating another aspect of an exemplary user interface for an IVR test case generator. The information contained herein and in subsequent figures (FIG. 6A-FIG. 6D) are from a real-world call placed between the inventor(s) and a test IVR system.

According to one embodiment, a software application operating on a computing device may comprise a dialing pad 601 to include a push-to-talk (PTT) 602 and a dial/hang-up button 603. The user interface (UI) may further comprise a call log 604 which displays the status, instructions, and steps being recorded by the IVR test case generator. When audio from the user (outgoing 606) or IVR system (incoming 605) is detected, it is recorded, saved, and made available for download. According to one embodiment, the information from the call log 604, the IVR system audio 605, and user audio 606 are automatically stored in a data store, hard disk, RAM, or any other computer storage device.

FIG. 6B is a block diagram illustrating another aspect of an exemplary user interface for an IVR test case generator. This diagram illustrates the results 610 of the automated processing by the IVR test case generator after a call is completed. The results screen 610 displayed which informs a user that the system has successfully imported the data, if any step was not validated correctly, and then proceeds the user to the next screen, according to one embodiment.

In another embodiment, users may edit data if not transcribed or imported correctly as described in FIG. 3. Upon editing and verifying the imported data, users may choose to run an automated test iteration. The recorded test scenario is now available for all future test iterations. According to another aspect, saved test scenarios may be used to generate new test scenarios by changing responses or DTMF tones or by altering the previous test in such a way that the alteration yields a different test scenario.

FIG. 6C is a block diagram illustrating another aspect of an exemplary user interface for an IVR test case generator. This diagram is displayed to a user while the automated test is being performed automatically by the IVR test case generator. The screen comprises a column showing the steps 620, columns for the transcribed audio question/statement 621 and response 622, and a column for various metrics such as success or failure, transcription confidence rate, response time, duration, additional options, and download link 623. Some embodiments comprise waiting animations 624 used for showing that the call is in progress or other typical wait functions known in the computing industry.

FIG. 6D is a block diagram illustrating another aspect of an exemplary user interface for an IVR test case generator. According to this aspect, a screen displaying the results of the automated IVR test case is shown 630. IVR testing personnel may now use this verified test case to automatically perform future iterations of this test case. User do not necessarily need to initiate the automated test cases. The IVR test case generator may be configured to perform regression testing at specified intervals or triggered when an IVR system implements a change.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. 8, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 7). Examples of storage devices 26 include flash memory, magnetic hard drive, CD-ROM, and/or the like.

Figure 9:
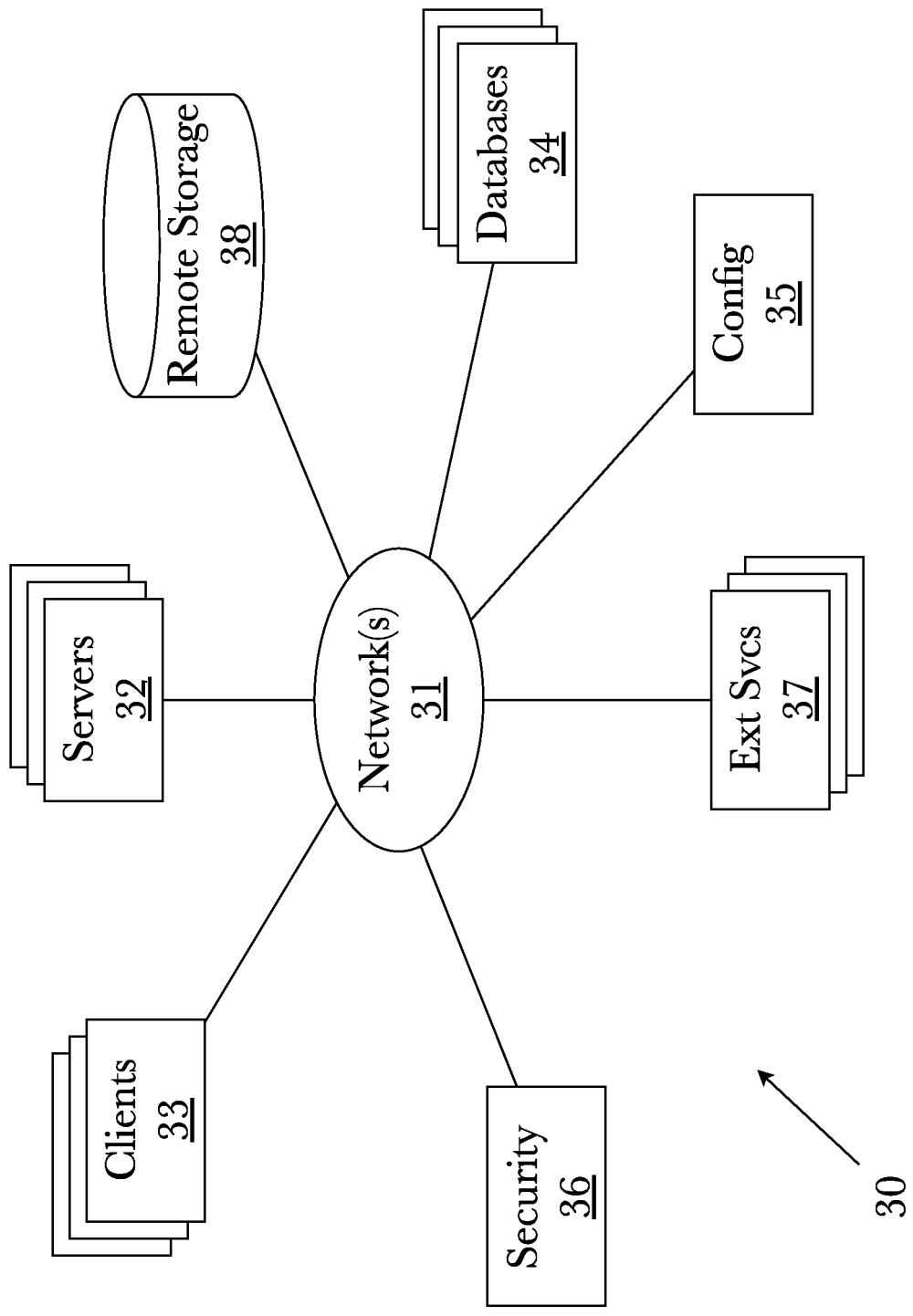
FIG. 9 is a block diagram showing an exemplary architectural arrangement of clients, servers, and external services.

In some aspects, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 10:
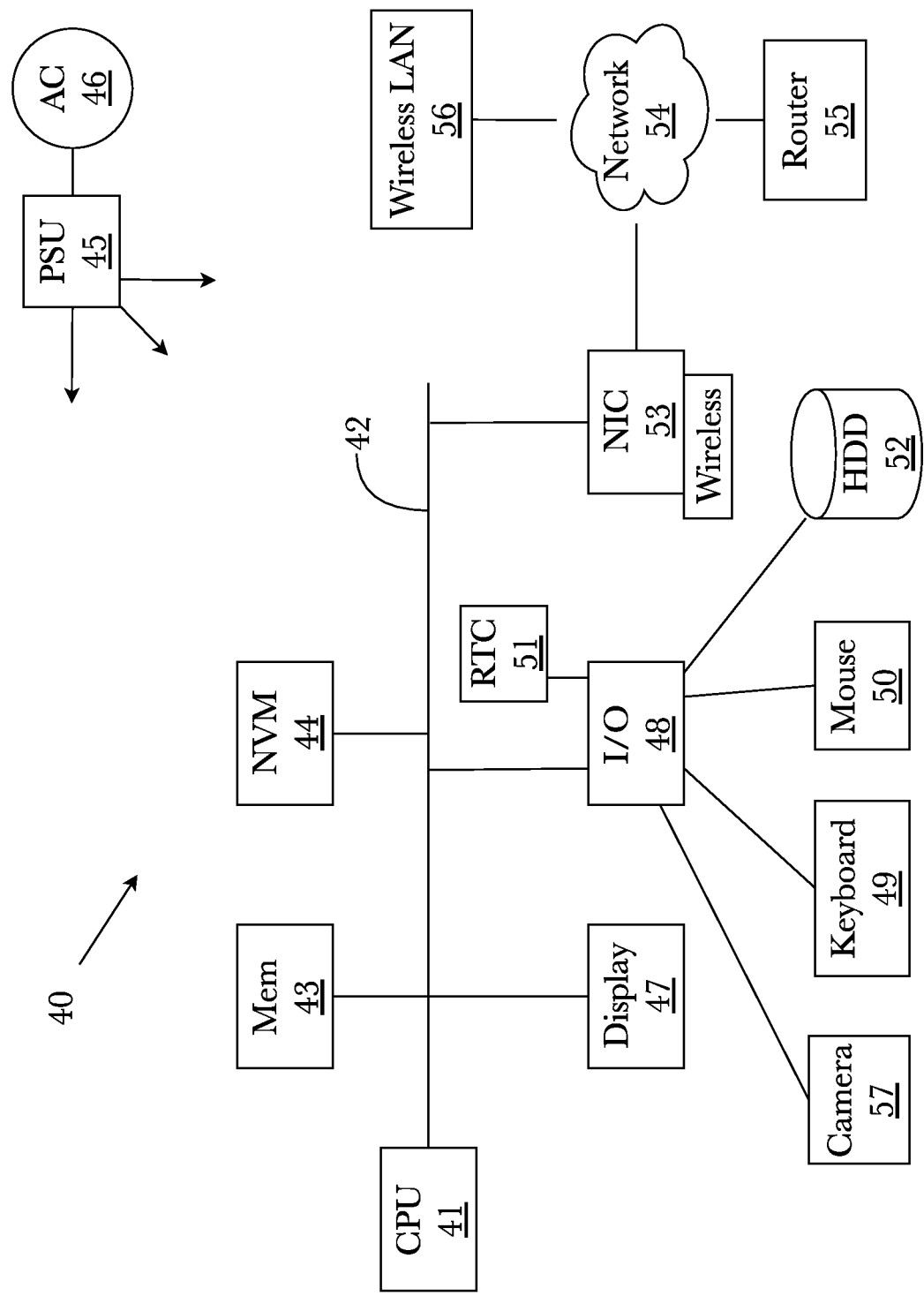
FIG. 10 is another block diagram illustrating an exemplary hardware architecture of a computing device.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automatically synthesizing interactive voice response (IVR) test cases from natural interactions, comprising:
   a browser-based IVR test administration interface comprising a soft phone;
   an IVR test case generator comprising at least a plurality of programming instructions stored in a memory of, and operating on at least one processor of, a computing device, wherein the plurality of programming instructions, when operating on the at least one processor, cause the computing device to:
receive a live phone call from the soft phone, the live phone call comprising human interaction with an IVR system;
record audio, in a plurality of segments, from the live phone call;
extract IVR test case data from the recorded audio, the IVR test case data comprising a plurality of audio segments, dual-tone multi-frequency signals, and metadata elements;
automatically transcribe each of the segments from the plurality of audio segments that comprise human speech generating a plurality of speech transcriptions thereby;
use the metadata, the plurality of speech transcriptions, and the dual-tone multi-frequency signals to automatically create a first IVR test case for the IVR system; and
starting with the first IVR test case, automatically generate a plurality of additional test cases for the IVR system by iterating one or more parameters of the first IVR test case, wherein at least one of the plurality of additional test cases comprises generation of an incorrect voice response or an incorrect DTMF signal for testing security of the IVR system.

2. The system of claim 1, wherein the metadata comprises identifying information as to the source and geolocation of received data.

3. The system of claim 1, further comprising machine learning algorithms.

4. The system of claim 3, wherein the machine learning algorithms alter the audio stream recorded by the IVR test case generator.

5. The system of claim 3, wherein the machine learning algorithms generate synthetic audio streams.

* * * * *